(12) United States Patent
Aiso

(10) Patent No.: US 9,595,095 B2
(45) Date of Patent: Mar. 14, 2017

(54) ROBOT SYSTEM

(71) Applicant: Seiko Epson Corporation, Tokyo (JP)

(72) Inventor: Seiji Aiso, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/747,189

(22) Filed: Jun. 23, 2015

(65) Prior Publication Data

US 2016/0005161 A1 Jan. 7, 2016

(30) Foreign Application Priority Data

Jul. 1, 2014 (JP) ................... 2014-136314

(51) Int. Cl.
*G06K 9/00* (2006.01)
*G06T 7/00* (2006.01)
*B25J 9/16* (2006.01)
*G06K 9/62* (2006.01)

(52) U.S. Cl.
CPC ........... *G06T 7/0004* (2013.01); *B25J 9/1697* (2013.01); *G06K 9/6255* (2013.01); *G06T 7/001* (2013.01); *G06T 7/0042* (2013.01); *G06T 7/0083* (2013.01); *G06K 2209/19* (2013.01); *G06T 2207/20144* (2013.01); *G06T 2207/20192* (2013.01); *G06T 2207/30108* (2013.01)

(58) Field of Classification Search
CPC ... G06T 7/0004; G06T 7/0042; G06T 7/0083; G06T 7/602
USPC .................................................. 382/153, 201
See application file for complete search history.

(56) References Cited

U.S. PATENT DOCUMENTS

2013/0202212 A1* 8/2013 Wu .......................... G06K 9/46
382/201

FOREIGN PATENT DOCUMENTS

JP 2010-097436 A 4/2010

* cited by examiner

*Primary Examiner* — Ruiping Li
(74) *Attorney, Agent, or Firm* — Harness, Dickey & Pierce, P.L.C.

(57) ABSTRACT

A robot system includes a processing apparatus that detects one work from a plurality of works, and a robot that operates the detected one work. The processing apparatus includes a display unit that displays image data containing an image of the plurality of works captured by an imaging apparatus, a selection unit that selects a first image and a second image from the image data, and a processing unit that generates a model based on the first image and the second image and detects the one work using the generated model.

17 Claims, 9 Drawing Sheets

| WORK | BEFORE MODEL ADDITION | AFTER MODEL ADDITION |
|---|---|---|
| Wk1 | 892 | 950 |
| Wk2 | 994 | 996 |
| Wk3 | 879 | 942 |

ROBOT SYSTEM

BACKGROUND

1. Technical Field

The present invention relates to a robot system.

2. Related Art

In related art, robot systems for robots to pick up works (objects) and arrange the works in predetermined positions and poses have been developed. In the robot system, when the object is picked up, the object is detected by pattern matching between the shape of the object and a shape of a target shown by a model registered in advance.

For example, an image processing apparatus disclosed in Patent Document 1 (JP-A-2010-97436) uses a pattern model corresponding to a registered image registered in advance for searching for a search object similar to the registered image from a search object image and performs positioning. Further, in generation of a model, a plurality of objects are captured and captured images are acquired in advance, and an image of one arbitrary object of the plurality of objects is selected. The image of the selected one object can be used for pattern matching processing.

However, pattern matching processing between the shape of the target according to the generated model and the object to be worked can be unsuccessful by the following causes.

(1) Changes in shadow cast: When an object having a solid shape is irradiated with light, a shadow as a part in which the light is blocked by the object is formed around the object. Accordingly, shadow cast changes in response to changes of a light source (e.g., illumination, environment light, or the like) and changes in position and pose relationships between the light source and the object. Even when the light source is unchanged, the shadow cast changes in response to the position and pose of the object placed within a field of view of an imaging apparatus.

(2) Changes in pose of object having solid shape: An object placed within a field of view of an imaging apparatus has a solid shape, and its planar shape differs depending on its pose. Further, even when poses of objects are the same, apparent contour shapes differ depending on a difference in position within the field of view. Particularly, in an imaging apparatus including a wide lens, the shape difference clearly appears between an object placed on an optical axis and an object having the same solid shape placed on the periphery of the field of view.

(3) Changes in texture of object, changes in texture due to reflection by object surface: a texture (pattern) on a surface of an object apparently changes because the position within the field of view of the imaging apparatus differs depending on its part. Further, a glossy object reflects arriving light, and its pattern apparently changes depending on the amount of light or the arriving direction. Furthermore, for example, even objects having the same shape and size like prints of best-before dates attached to wrappings of foods may have parts individually different in appearance.

(4) Existence of surrounding objects: In pattern matching processing, images representing targets are registered as models. In this regard, a registered area (window) may contain images of other objects than the targets.

SUMMARY

An advantage of some aspects of the invention is to provide a robot system that may reliably detect objects.

An aspect of the invention is directed to a robot system including a processing apparatus that detects one work from a plurality of works, and a robot that operates the detected one work, wherein the processing apparatus includes a display unit that displays image data containing an image of the plurality of works captured by an imaging apparatus, a selection unit that selects a first image and a second image from the image data, and a processing unit that generates a model based on the first image and the second image and detects the one work using the generated model.

According to this configuration, the work is detected using the model generated based on the first image and the second image under a different imaging condition. Accordingly, even when there is a change in appearance due to the difference between the imaging conditions, a work as a detection object may be reliably detected.

In another aspect of the invention, in the robot system described above, the processing unit may include a feature extraction part that extracts a feature with respect to each area obtained by respective segmentation of the first image, the second image, and the image data, a model integration part that generates a model containing an image feature as one of a feature of the first image and a feature of the second image and a mask area in which the feature of the first image and the feature of the second image are different, and a matching part that performs matching between an area formed by exclusion of the mask area from the image feature and a feature of the image data.

According to this configuration, the area in which the features are different between the first image and the second image is excluded, and matching is performed between the areas with features unchanged due to the difference between the imaging conditions. Accordingly, a work as a detection object may be reliably detected.

In another aspect of the invention, in the robot system described above, the feature extraction part may respectively extract edges with respect to the first image, the second image, and the image data.

According to this configuration, matching is performed based on the edges showing the contours and patterns of the works as features of images, and the position and direction of a work as a detection object may be efficiently detected.

In another aspect of the invention, in the robot system described above, the model integration part may associate position and pose relationships between the feature of the first image and the feature of the second image and determine the mask area.

According to this configuration, even when the position or pose relationships do not coincide between the first image and the second image, a mask area with different features between the corresponding areas of the first image and the second image may be determined.

In another aspect of the invention, in the robot system described above, the model integration part may perform expansion processing with respect to at least one of the feature of the first image and the feature of the second image and determines a mask area in which the feature of the first image and the feature of the second image are different.

According to this configuration, even when the position relationships are slightly different due to the difference between the imaging conditions of the first image and the second image, the features may be compared between the corresponding areas, and a work as a detection object may be reliably detected.

In another aspect of the invention, in the robot system described above, the matching part may calculate a score indicating a degree of coincidence between an area obtained by changing the position and direction with respect to the area formed by exclusion of the mask area from the image feature and the feature of the image data with respect to each amount of change of the position and direction, and detect the position and direction of the one work based on the scores.

According to this configuration, the area corresponding to the area formed by exclusion of the mask area from the image feature is quantitatively specified in the image data, and thereby, the work represented by the image feature and its position and direction may be detected.

In another aspect of the invention, in the robot system described above, the processing apparatus may include a detection unit that determines whether or not to have detected the one work based on the scores calculated by the matching part.

According to this configuration, whether or not the object detection according to the image feature is successful may be quantitatively determined based on the degree of coincidence between the feature of the image data and the area formed by exclusion of the mask area from the image feature.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

As below, an embodiment of the invention will be explained in detail with reference to the drawings.

Figure 1:
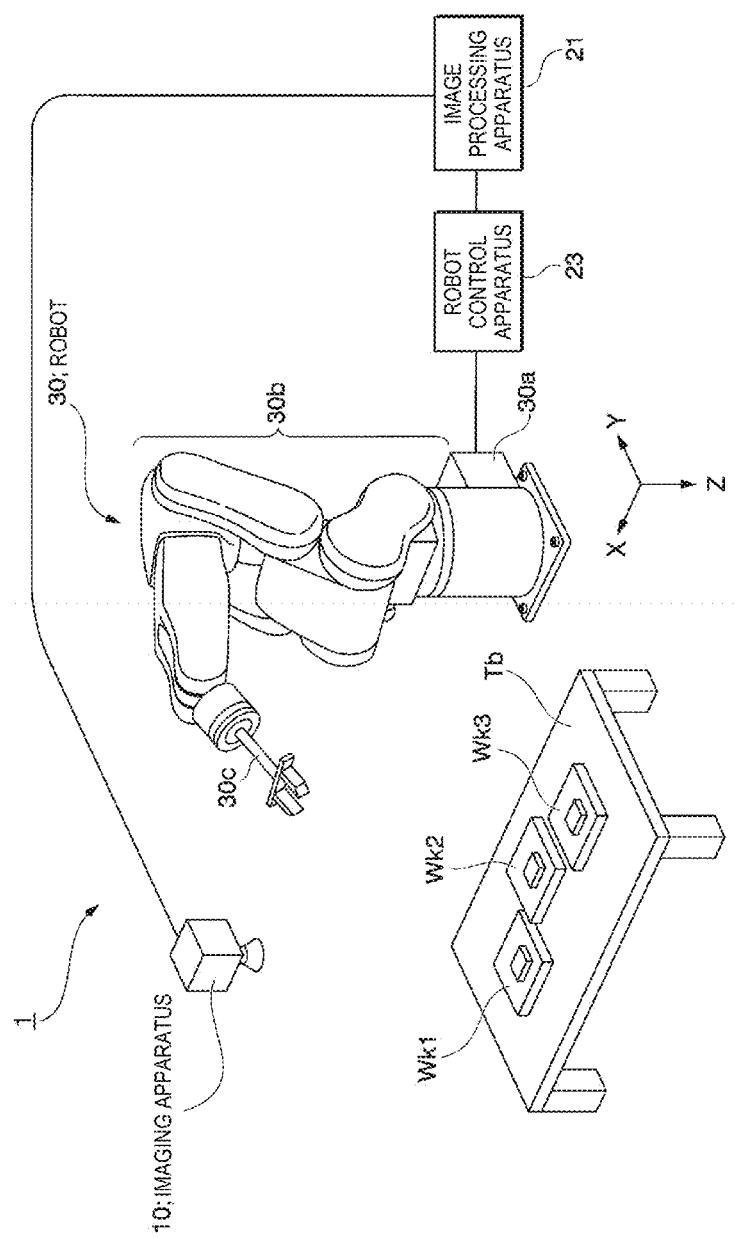
FIG. 1 is a schematic perspective view of a robot system according to an embodiment.

FIG. 1 is a schematic perspective view of a robot system 1 according to the embodiment.

As shown in FIG. 1, the robot system 1 includes an imaging apparatus 10, an image processing apparatus 21, a robot control apparatus 23, and a robot 30. Note that scales of parts, structures, etc. in FIG. 1 may differ from actual scales for clarification of the drawings.

Wire or wireless connections are made between the imaging apparatus 10 and the image processing apparatus 21, the image processing apparatus 21 and the robot control apparatus 23, and the robot control apparatus 23 and the robot 30 for communication. In wire communication, a communication standard of e.g., USB (Universal Serial Bus), IEEE (Institute of Electrical and Electronics Engineers) 802.3, or the like may be used. In wireless communication, a communication standard defined by e.g. IEEE 802.11a/b/g/n, IEEE 802.15.1, or the like may be used.

The imaging apparatus 10 captures an image of a work placed within its field of view and generates image data representing the captured image. The imaging apparatus 10 is a camera including e.g. a CCD (Charge Coupled Device) or CMOS (Complementary Metal Oxide Semiconductor) as an imaging device that converts collected lights into electric signals. Further, the imaging apparatus 10 may be a network camera having an interface for transferring the generated image data to the image processing apparatus 21 in real time.

In the example shown in FIG. 1, the imaging direction of the imaging apparatus 10 is directed to a vertical direction (Z-direction) and images containing three works Wk1 to Wk3 mounted on a table Tb as subjects are captured. The surface of the table Tb is in parallel to a horizontal plane. The works Wk1 to Wk3 are placed in different positions not to overlap with each other and have different relative position relationships with the imaging apparatus 10. The works Wk1 to Wk3 may be targets for matching or objects to be worked.

An X-direction, a Y-direction, a Z-direction are three-dimensional directions orthogonal to one another forming a three-dimensional orthogonal coordinate system. In FIG. 1, the X-direction, the Y-direction, and the Z-direction are shown in the leftward direction, the depth direction, and the downward direction, respectively.

The image processing apparatus 21 displays a plurality of work images represented by image data input from the imaging apparatus 10, and selects a first image and a second image of the plurality of work images in response to operation input by a user. In the example shown in FIG. 1, image data representing an image containing the three works Wk1 to Wk3 mounted on the table Tb is input from the imaging apparatus 10 and the image processing apparatus 21 displays the image representing the three works Wk1 to Wk3 based on the input image data. The image processing apparatus 21 respectively selects areas representing two of the works Wk1 to Wk3 as the first image and the second image based on the operation input. The works Wk1 to Wk3 have shapes, sizes, kinds in common and have different position relationships with the imaging apparatus 10 as imaging conditions. For example, the works Wk1 to Wk3 are works including various assembly parts, screws, nails, bolts, and nuts operable by the robot 30.

The image processing apparatus 21 generates a model based on the selected first image and second image, and detects one work using the generated model. The model is information relating to a target as a detection target. In the following explanation, data representing the model may be referred to as "model data". The model data includes image data of an image representing a target and mask data. The mask data is data representing an area not considered in matching processing (mask) of the image representing the target. Model generation processing performed when the model is generated will be described later.

Further, when detecting one work, the image processing apparatus 21 performs matching processing to the model data with respect to the acquired image data. The image processing apparatus 21 outputs detection information on the detected one work to the robot control apparatus 23. The detection information includes information representing e.g. the position and pose of the detected object. Work detection processing performed when one work is detected will be described later. Note that, in the detection of one work, other image data than the image data used for generation of the model may be used.

To the robot control apparatus 23, the detection information is input from the image processing apparatus 21 and a load signal representing magnitudes of force and moment detected by the robot 30 is input. The robot control apparatus 23 generates a control signal for controlling the action of the robot 30 based on one or both of the detection information and the load signal. The robot control apparatus 23 outputs the generated control signal to the robot 30. The robot control apparatus 23 allows the robot 30 to operate e.g. the work detected by the image processing apparatus 21 of the three works Wk1 to Wk3 mounted on the table Tb.

The robot 30 is a six-axis articulated robot including a support 30a, an arm part 30b, and a hand part 30c. The robot 30 has degrees of freedom of six axes by the linkage action of the support 30a, the arm part 30b, and the hand part 30c, and may freely change the position and pose of a work Wk grasped by the hand part 30c. Further, the robot 30 allow one or a combination of the arm part 30b and the hand part 30c to act based on the control signal input from the robot control apparatus 23. The hand part 30c has two end portions and the two end portions are provided so that their longitudinal directions face each other. Thereby, the robot 30 may grasp the work detected by the image processing apparatus 21 and operate its position and pose.

The robot 30 includes a force sensor (not shown) that detects the force and the moment applied to the hand part 30c at predetermined time intervals (e.g. 1 ms), and outputs a load signal representing the detected force and moment to the robot control apparatus 23. The robot 30 includes an encoder (not shown). The encoder detects angles of the respective joints of the robot 30 and outputs the detected angles of the respective joints to the robot control apparatus 23.

Note that the degrees of freedom of the robot 30 are not limited to the six axes, but may be seven or more or five or less axes. Further, the support 30a may be installed in a location fixed with respect to a floor surface such as a wall or ceiling.

Further, in FIG. 1, the case where the imaging apparatus 10 is fixed in a space in which the support 30a is attached is shown as an example, however, the imaging apparatus 10 may be attached to the arm part 30b of the robot 30 or another movable part.

Next, a configuration of the image processing apparatus 21 will be explained.

Figure 2:
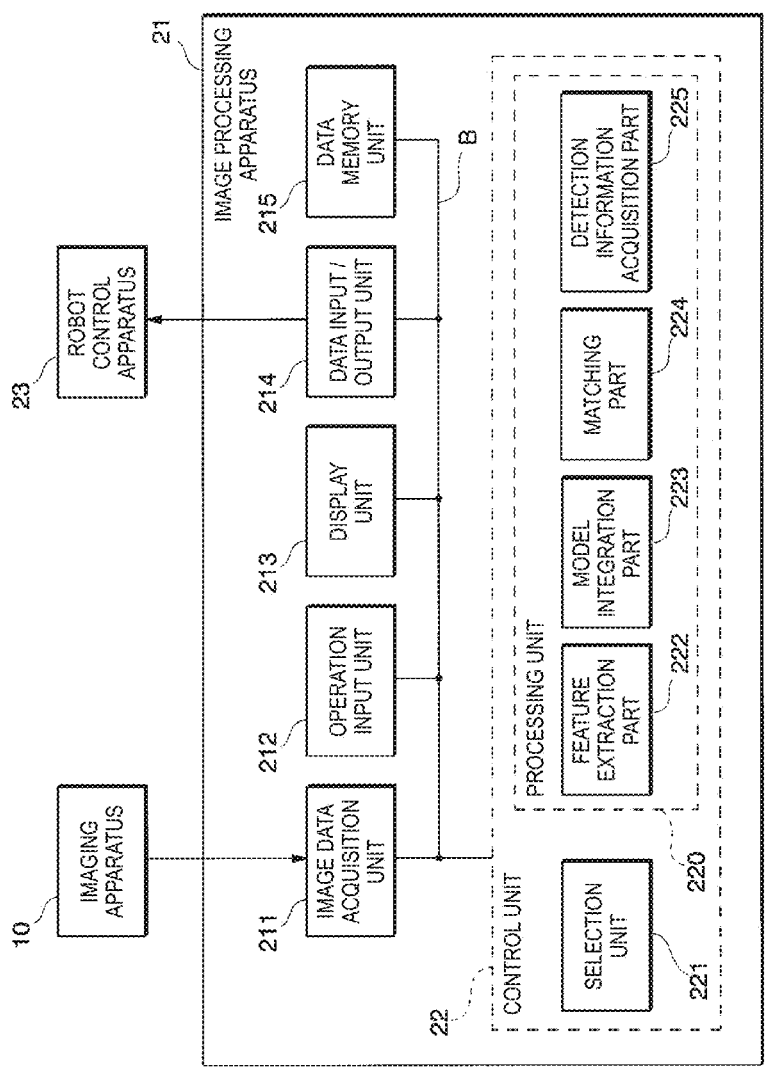
FIG. 2 is a schematic block diagram showing a configuration of an image processing apparatus according to the embodiment.

FIG. 2 is a schematic block diagram showing the configuration of the image processing apparatus 21 according to the embodiment.

The image processing apparatus 21 includes an image data acquisition unit 211, an operation input unit 212, a display unit 213, a data input/output unit 214, a data memory unit 215, and a control unit 22. The image data acquisition unit 211, the operation input unit 212, the display unit 213, the data input/output unit 214, the data memory unit 215, and the control unit 22 are connected to one another by a bus (base line) B to mutually input and output data.

The image data acquisition unit 211 acquires the image data input from the imaging apparatus 10 and stores the acquired image data in the data memory unit 215. The image data acquisition unit 211 includes e.g. a data input/output interface.

The operation input unit 212 receives the operation input by the user and generates an instruction signal representing an instruction in response to the received operation input.

The operation input unit 212 outputs the generated instruction signal to the control unit 22. The instruction signal includes e.g. an area signal for instructing a partial area of the image displayed on the display unit 213, a setting signal for instructing setting of various parameters and data, a model image generation instruction signal for instructing generation of the model image data, which will be described later, and a work detection processing start signal for instructing the start of the work detection processing, which will be described later.

The operation input unit 212 may include e.g. a keyboard, a mouse, a touch sensor, and other input devices. Note that these input devices may be external devices connected via a data input/output interface or the like in place of built-in devices in the image processing apparatus 21.

The display unit 213 displays an operation screen based on operation screen data read out from the data memory unit 215 by the control unit 22. The operation screen is a screen used for the user to operate the image processing apparatus 21 and the robot control apparatus 23. The operation screen contains various images including the image represented by the image data input from a selection unit 221, which will be described later, and screen parts (buttons, icons, text boxes, etc.) for the user to give various instructions. As will be described later, the display unit 213 displays a plurality of work images represented by the image data read out from the data memory unit 215. Thereby, the user may instruct areas representing at least two works of the plurality of work images via the operation input unit 212. An example of the operation screen will be described later.

Note that the display unit 213 includes e.g. a liquid crystal display (LCD). The display unit 213 may be a touch panel integrated with the touch sensor of the operation input unit 212.

The data input/output unit 214 outputs work detection data input from the control unit 22 to the robot control apparatus 23. The work detection data is data generated by the work detection processing, which will be described later. The data input/output unit 214 includes e.g. a data input/output interface.

The data memory unit 215 stores various kinds of data, programs, etc. relating to the processing of the image processing apparatus 21. The data memory unit 215 includes e.g. a memory medium such as an HDD (Hard-Disk Drive), a ROM (Read-Only Memory), or a RAM (Random Access Memory). Note that the data memory unit 215 may be an external memory device connected by a data input/output interface or the like in place of a built-in device in the image processing apparatus 21.

The control unit 22 operates predetermined programs to fulfill the function of the image processing apparatus 21. The control unit 22 includes e.g. a control apparatus such as a CPU (Central Processing Unit). The control unit 22 reads out the program stored in advance from the data memory unit 215 and operates the read out program, and thereby, functions as a processing unit 220 and the selection unit 221. Further, the processing unit 220 includes a feature extraction part 222, a model integration part 223, a matching part 224, and a detection information acquisition part 225.

Note that the control unit 22 reads out operation screen data from the data memory unit 215 at the start of operation of the program, and outputs the read out operation screen data to the display unit 213.

The selection unit 221 specifies an area represented by the area signal input from the operation input unit 212 on the image displayed by the display unit 213. The selection unit 221 extracts image data representing the image within the specified area from the image data relating to the image displayed on the display unit 213 in response to the input of the image generation instruction signal. Thereby, the area in which one work of the displayed plurality of works is selected.

Note that, in the following explanation, the extracted image data is referred to as "model image data" and the image represented by the model image data is referred to as "model image".

The selection unit 221 repeats processing of extracting the model image data in response to the re-input of the image generation instruction signal, and generates at least two pieces of model image data. Thereby, at least two different work images are selected. The selection unit 221 stores the generated model image data in the data memory unit 215.

Note that, in the following explanation, one piece of the generated model image data is referred to as "base model image data" and the other pieces of model image data are referred to as "additional model image data". The base model image data is model image data serving as a basis for the model integration processing, which will be described later. The additional model image data is model image data as an integration object in the model integration processing, which will be described later. The original image data from which the base model image data is extracted and the original image data from which the additional model image data is extracted may be the same or different. The original image data from which the base model image data is extracted and the original image data from which the additional model image data is extracted may be different as long as the work represented by the base model image data and the work represented by the additional model image data are different at least in position or pose, and have the same shape and size.

The feature extraction part 222 reads out model image data newly stored in the model generation processing, which will be described later, from the data memory unit 215. The feature extraction part 222 extracts a feature, e.g. an edge with respect to each small area formed by segmentation of the image represented by the read out model image data. The edge refers to a portion in which the brightness and the color spatially and abruptly changes representing a boundary of figures forming the contour of the work and the pattern of the work surface. In other words, the edge refers to information representing the feature of the work shape and the surface condition and differs depending on the difference in imaging condition including the position and pose of the work and the irradiation status of the light beam.

In edge extraction processing, for example, the feature extraction part 222 calculates an edge strength in each direction with respect to each pixel using a Sobel filter with respect to the horizontal direction and the vertical direction. The edge strength is a value representing the degree of the spatial change of the brightness value. The feature extraction part 222 calculates a square root of a sum of squares with respect to each pixel for the edge strength in each direction of the horizontal direction and the vertical direction, and determines the calculated value as an edge strength integrated between the directions. The feature extraction part 222 determines the pixel having the determined edge strength larger than a predetermined threshold value of the edge strength, and generates an edge map showing edges formed from the edge pixels.

The feature extraction part 222 associates the generated edge map with the model image data used for the generation of the edge map, and stores it as model data in the data memory unit 215. Note that model data containing the base model image data as model image data is referred to as "base model data" and model data containing the additional model image data as model image data is referred to as "additional model data".

The feature extraction part 222 reads out image data input from the imaging apparatus 10 via the image data acquisition unit 211 and sequentially stored in the data memory unit 215 in a runtime. The runtime is started in response to input of a work detection processing start signal from the operation input unit 212 to the control unit 22. In the following explanation, the read out image data is referred to as "object image data" and distinguished from the model image data. The object image data may be separate from or the same as the original image data from which the base model image data is extracted.

The feature extraction part 222 also performs the above described edge extraction processing and generates an edge map with respect to the object image data. The feature extraction part 222 stores the generated edge map in the data memory unit 215.

The model integration part 223 reads out the base model data and the additional model data from the data memory unit 215, and performs the model integration processing on the read out base model data and additional model data to generate integrated model data. In the model integration processing, the model integration part 223 extracts an area where the edge shown by the edge map contained in the base model data and the edge shown by the edge map contained in the additional model data are different as a mask. The model integration part 223 generates mask data representing the extracted mask and adds the generated mask data to the base model data, and thereby, generates the integrated model data.

Further, when there are a plurality pieces of additional model data, the model integration part 223 generates integrated model data using the integrated model data generated with respect to one piece of additional model data as base model data with another one piece of additional model data. In this case, the model integration part 223 adds a newly extracted mask to the mask represented by the existing mask data, and generates mask data representing the added mask data. The model integration part 223 updates the existing mask data to the newly generated mask data, and thereby, forms integrated model data.

The model integration part 223 stores the generated integrated model data in the data memory unit 215.

The matching part 224 reads the edge map relating to object image data newly stored in the data memory unit 215 and the previously stored integrated model data in a runtime. In the following explanation, the newly stored edge map is referred to as "object edge map" and distinguished from the edge map contained in the integrated model data. The matching part 224 extracts the edge map and the mask data from the integrated model data, excludes the part of the mask represented by the mask data from the edge shown by the extracted edge map, and specifies the edge not excluded, but left. The left edge is referred to as "reference edge". The matching part 224 performs matching processing between the edge shown by the object edge map and the reference edge.

In the matching processing, the matching part 224 searches for a search condition under which the reference edge corresponds to the edge shown by the object edge map. The search condition is a set containing a position of the reference edge on the object edge map, a direction of the reference edge, and a scaling factor of the reference edge. The scaling factor of the reference edge refers to a ratio of the size of the enlarged or reduced reference edge to the size of the original reference edge. The matching part 224 calculates a matching score between the edges shown by the object edge map with respect to each different search condition, and obtains a search condition under which the matching score becomes the maximum in response to the change of the search condition. The matching part 224 outputs the obtained search condition (position, direction, scaling factor) and matching information representing the matching score calculated under the search condition to the detection information acquisition part 225.

The matching score is an index indicating the degree of coincidence between two edges. The matching part 224 may use a score described in Patent Document 1 as a matching score. For example, the matching part 224 may use a value obtained by division of a sum obtained by integration of the degrees of coincidence between an edge angle bit in the edge pixel shown by the object edge map and an edge angle bit in the edge pixel contained in the reference edge between pixels by the number of base points as a matching score. The edge angle bit is a value formed by quantization of the edge direction using a predetermined quantization width (e.g. 18°). The degree of coincidence takes a larger real number as two values to be compared are closer to each other and takes the maximum value "1" when the two values are equal. The number of base points is the number of edge pixels forming the reference edge.

Further, the matching part 224 may use a value obtained by division of the number of pixels of the edge pixels shown by the object edge map corresponding to the edge pixels contained in the reference edge by the number of base points as a matching score.

The detection information acquisition part 225 determines whether or not detection of an object of the same kind as the target from the image data has been successful based on the matching information input from the matching part 224. If the matching score represented by the matching information is equal to or more than the predetermined threshold value of the matching score (also called a score acceptable value or an acceptable value), the detection information acquisition part 225 determines that the detection of the object of the same kind as the target from the image data has been successful. If the successful detection is determined, the detection information acquisition part 225 coordinate-transforms the position and direction represented by the matching information from the camera coordinate system to the robot coordinate system. The camera coordinate system is a coordinate system with reference to the optical system of the imaging apparatus 10 and the robot coordinate system is a coordinate system with reference to the robot 30. Therefore, the transformed position and direction show the position and direction of the object shown by each captured image. The detection information acquisition part 225 generates detection information representing the transformed position and direction and the successful detection.

If the matching score represented by the matching information is less than the predetermined score acceptable value, the detection information acquisition part 225 determines that the detection has been unsuccessful. The detection information acquisition part 225 generates detection information representing the unsuccessful detection.

The detection information acquisition part 225 outputs the generated detection information to the robot control apparatus 23 via the data input/output unit 214.

Next, an example of the operation screen will be explained.

Figure 3:
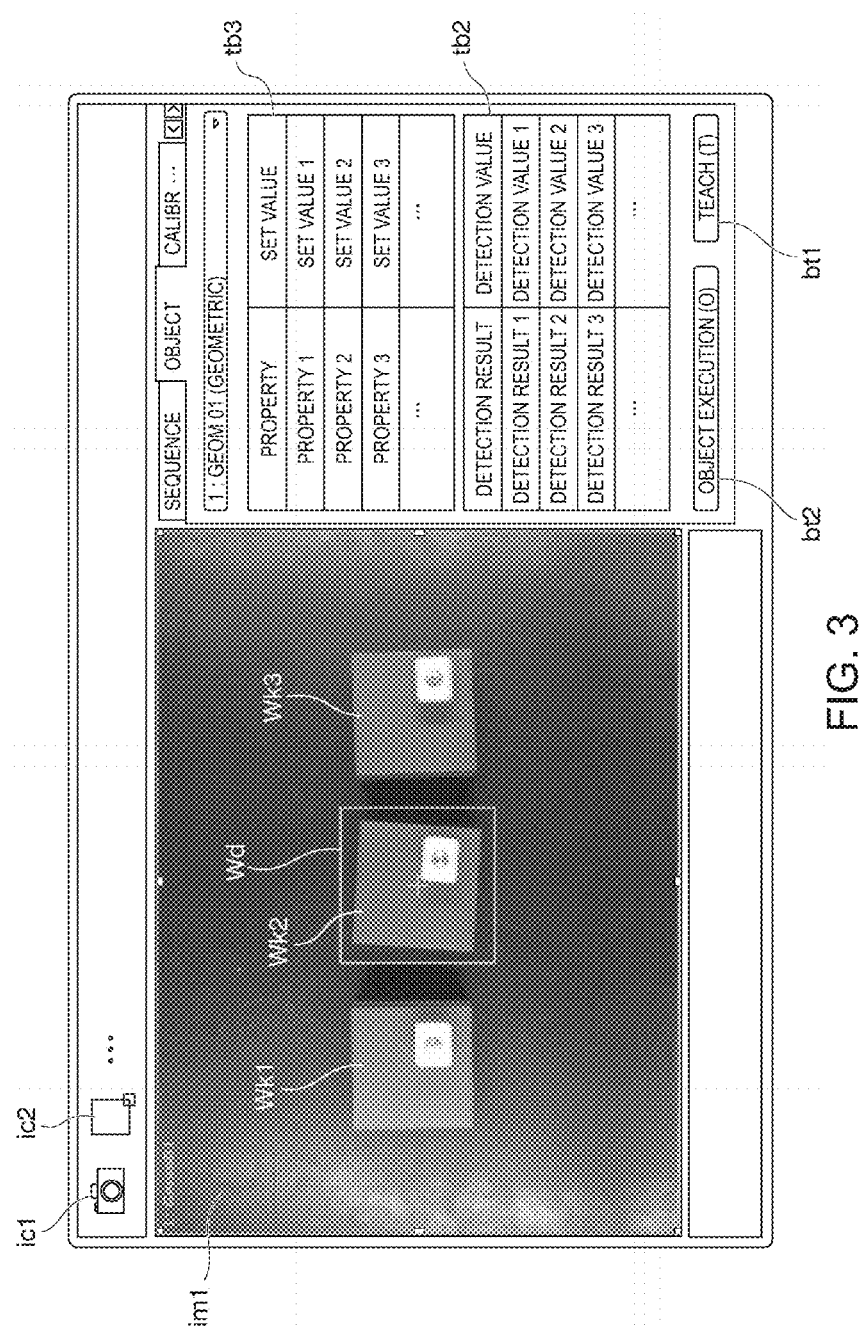
FIG. 3 shows an example of an operation screen displayed on a display unit according to the embodiment.

FIG. 3 shows an example of the operation screen displayed on the display unit 213 according to the embodiment.

The operation screen shown in FIG. 3 includes icons ic1, ic2, text boxes tb1, tb2, buttons bt1, bt2, and a displayed image im1.

The icon ic1 is a graphic design of a camera and displayed on the left end of an upper left menu bar of the operation screen. When the display area of the icon ic1 is designated (hereinafter, expressed by "pressed down") by the operation input of the user, the control unit 22 reads out the image data input from the imaging apparatus 10 from the data memory unit 215 and displays an image based on the read out image data within the operation screen. The displayed image im1 is an example of the image displayed by the control unit 22.

The icon ic2 is a square with the thicker lower right end and displayed on the left end immediately below the menu bar. When the icon ic2 is pressed down, the control unit 22 displays a window in a predetermined position of the displayed image. A window Wd displayed nearly at the center of the displayed image im1 is an example of the window displayed by the control unit 22. The window Wd is formed by a rectangular frame and a plus (+) mark at the center. The representative position of the window Wd on the displayed image im1 is designated by the position of the plus mark and its range is designated by the size of the frame. Further, the position and horizontal and vertical sizes of the window Wd on the displayed image im1 are variable in response to the operation input of the user. The user designates an area on the displayed image im1, and thereby, may designate a display area of one of the works Wk1 to Wk3 displayed on the displayed image im1. In the example shown in FIG. 3, the display area of the work Wk2 is designated.

The text box tb1 contains columns of a property and a set value. The property shows a type of the set value. In the columns of the set value, set values of respectively corresponding properties can be input in response to the operation input of the user. The properties include e.g. a range of the search condition, the score acceptable value, the number of searches, etc. As the search condition, the range of the pose, the scaling factor, or the like may be designated. The number of searches is the maximum number of edges of objects to be searched from the edge map relating to one piece of image data. The set value of the orientation range is e.g. −10° to +10°. The set value of the scaling factor is e.g. 0.7 to 1.5 times. The set value of the number of searches is e.g. one. The input set value is set in the matching part 224, and the set value is used for processing. Note that the matching part 224 may use the preset set values for the processing.

The text box tb2 contains columns of a detection result and a detection value. In the text box tb2, detection values with respect to each item of detection results of the work by matching performed in the matching part 224 are displayed. The items of the detection results include e.g. the matching score, the search condition (position, pose, scaling factor), the time required, etc.

The button bt1 is a button expressing a character string "TEACH". When the button bt1 is pressed down, the selection unit 221 extracts image data of the work shown in the designated area and generates first model image data (base model image data).

Then, the control unit 22 displays an instruction button 1 (not shown) for designation of a new area ("TEACH" of a new model) and an instruction button 2 (not shown) for model integration processing (sample addition) with respect to the model image data relating to the designated area within the operation screen.

In response to the press down of the instruction button 1, the selection unit 221 extracts the image data of the work shown within the designated area and generates additional model image data.

In response to the press down of the instruction button 2, the feature extraction part 222 generates base model data based on the base model image data, and generates additional model data based on the additional model image data. Then, the model integration part 223 performs model integration processing with respect to the base model data and the additional model data.

The button bt2 is a button expressing a character string "EXECUTE OBJECT". In response to the press down of the button bt2, the control unit 22 starts work detection processing, which will be described later.

Next, the model integration part 223 according to the embodiment will be explained.

Figure 4:
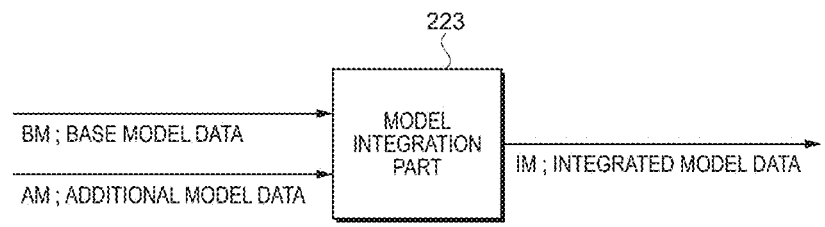
FIG. 4 is a conceptual diagram showing a function of a model integration part according to the embodiment.

FIG. 4 is a conceptual diagram showing a function of the model integration part 223 according to the embodiment.

The model integration part 223 acquires base model data BM and additional model data AM, performs model integration processing with respect to the acquired base model data BM and additional model data AM, and generates integrated model data IM. The generated integrated model data IM is used for work detection processing, which will be described later.

Next, a configuration example of model data MD will be explained.

Figure 5:
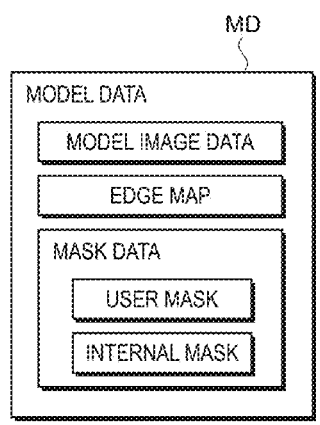
FIG. 5 shows a configuration example of model data.

FIG. 5 shows the configuration example of the model data MD.

The model data MD includes model image data, an edge map, and mask data. The configuration is common between the base model data BM and the additional model data AM.

The model image data is data representing a brightness value with respect to each pixel within the area designated by the selection unit 221. The edge map is data representing an edge area extracted from the model image data by the feature extraction part 222. The edge map is data having a signal value representing whether or not the pixel is an edge pixel with respect to each pixel. For example, the signal value is "1" for the edge pixel and the signal value is "0" for the non-edge pixel.

The mask data is data representing the mask area extracted by the model integration part 223. The mask data is data having a signal value representing whether or not the pixel belongs to the mask with respect to each pixel. For example, the signal value is "1" for the pixel belonging to the mask and the signal value is "0" for the pixel not belonging to the mask. Note that the mask data includes an internal mask and a user mask. The internal mask is data representing the mask extracted by the model integration part 223. The user mask is data representing the mask defined by the user. The internal mask and the user mask represent whether or not each one bit belongs to the mask with respect to each pixel.

Note that, in the specification, the mask refers to the internal mask unless otherwise stated.

Next, the model integration processing according to the embodiment will be explained.

Figure 6:
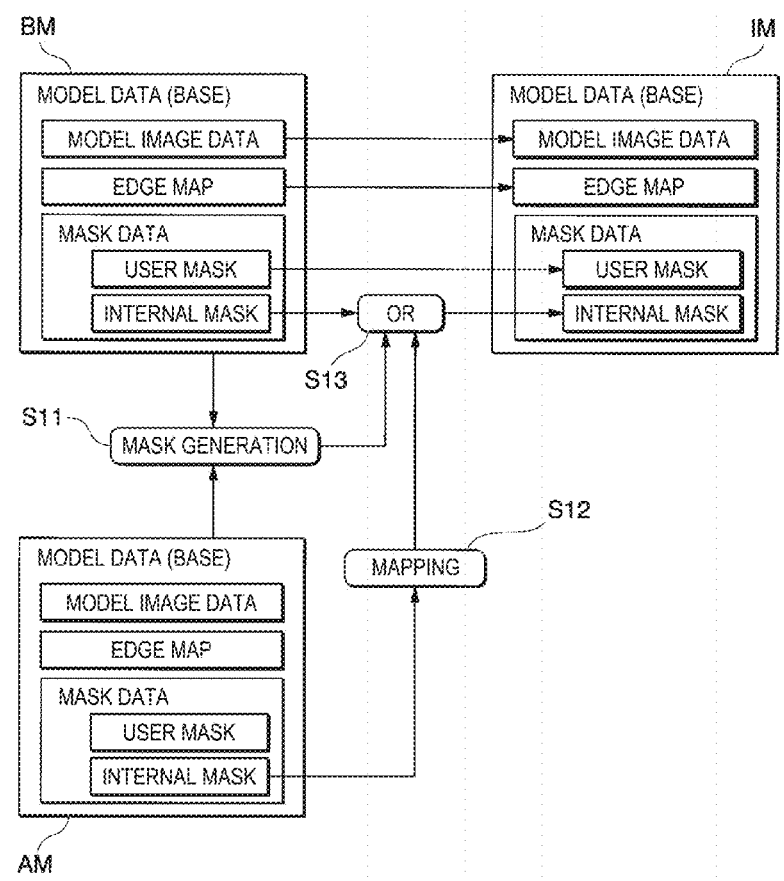
FIG. 6 is a conceptual diagram showing model integration processing according to the embodiment.

FIG. 6 is a conceptual diagram showing the model integration processing according to the embodiment.

The model integration processing includes mask generation processing (step S11), mapping processing (step S12), and OR processing (step S13).

Step S11

The model integration part 223 checks the edge area shown by the edge map contained in the base model data BM against the edge area shown by the edge map contained in the additional model data AM, and extracts a part in which the areas do not correspond to each other. The model integration part 223 generates an internal mask showing the extracted part.

Note that, when the position and pose relationship between the work represented by the image data relating to the base model data BM and the work represented by the image data relating to the additional model data AM are unknown, the model integration part 223 performs matching processing with respect to the edge area relating to the base model data BM and the edge area relating to the additional model data AM. Thereby, the positions and poses of the edge area relating to the base model data BM and the edge area relating to the additional model data AM are associated with each other and coordinate transformation coefficients expressing the position and pose relationship between the areas are obtained. The matching processing may be the same as the matching processing performed by the matching part 224. Then, the processing moves to step S12.

Step S12

The model integration part 223 extracts the internal mask from the additional model data AM and coordinate-transforms (maps) the extracted internal mask in the corresponding area on the internal mask of the base model data BM. The model integration part 223 may use the coordinate transformation coefficients obtained by the matching processing at step S11 in coordinate transformation. Then, the processing moves to step S13.

Step S13

The model integration part 223 determines an area belonging to at least one of the internal mask contained in the base model data BM, the internal mask generated at step S11, and the internal mask coordinate-transformed at step S12 as a new internal mask. Thereby, the areas belonging to the internal mask generated at step S11 and the internal mask coordinate-transformed at step S12 are added to the area of the internal mask contained in the base model data BM. The model integration part 223 updates the internal mask of the base model data BM to the newly determined internal mask. Then, the processing shown in FIG. 6 is ended.

Note that, regardless whether or not the internal mask is defined in the additional model data AM, the processing at step S12 may be omitted. Further, when the internal mask is not defined in the base model data BM, at step S13, the model integration part 223 may include the internal mask generated at step S11 in the base model data BM.

Next, the details of the mask generation processing at step S11 (FIG. 6) will be explained.

Figure 7:
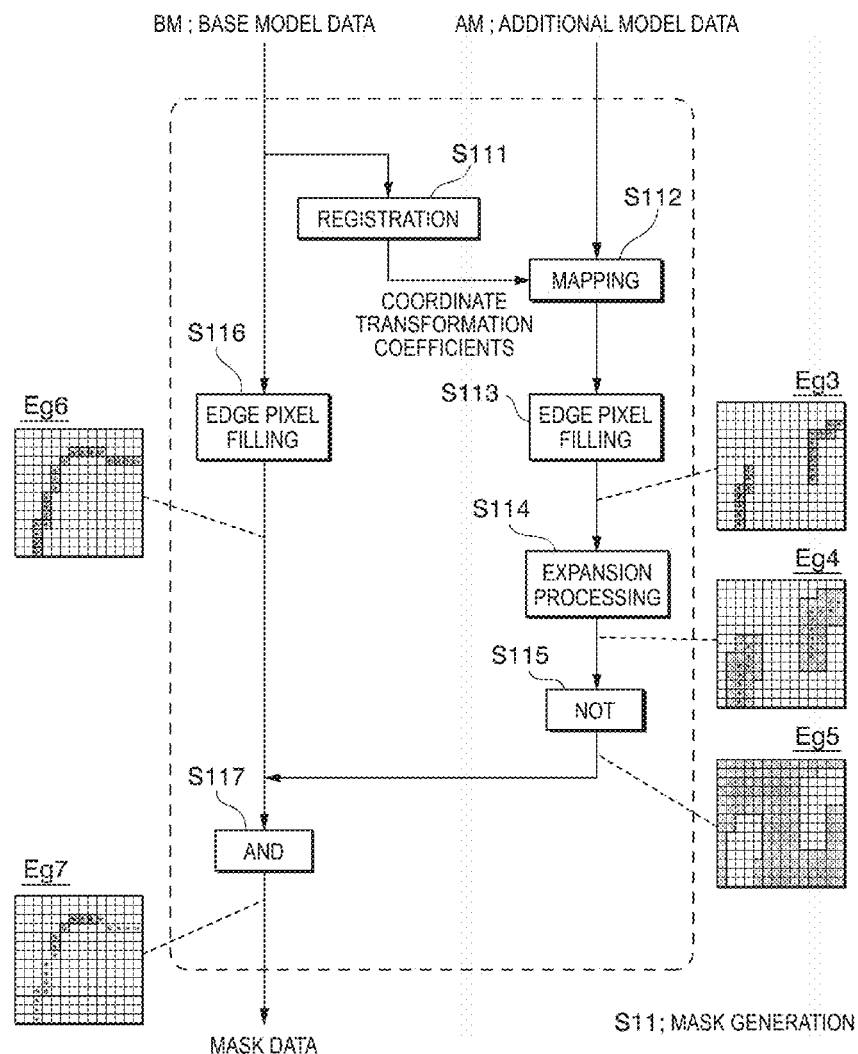
FIG. 7 is a conceptual diagram showing mask generation processing according to the embodiment.

FIG. 7 is a conceptual diagram showing the mask generation processing according to the embodiment.

The mask generation processing includes registration processing (step S111), mapping processing (step S112), edge pixel filling processing (step S113), expansion processing (step S114), NOT processing (step S115), edge pixel filling processing (step S116), and AND processing (step S117).

Step S111

The model integration part 223 acquires the coordinate transformation coefficients expressing the position and pose relationship between the work represented by the image data relating to the base model data BM and the work represented by the image data relating to the additional model data AM. When the position and pose relationship between the works is unknown, the model integration part 223 performs matching processing between the edges relating to the base model data BM and the edges relating to the additional model data AM, and thereby, acquires the coordinate transformation coefficients. Then, the processing moves to step S112.

Step S112

The model integration part 223 extracts an edge map from the additional model data AM. The model integration part 223 coordinate-transforms (maps) the edges shown by the extracted edge map using the acquired coordinate transformation coefficients. Thereby, the position and pose relationships are associated with each other between the edges shown by the extracted edge map and the edges shown by the edge map of the base model data BM. Then, the processing moves to step S113.

Step S113

The model integration part 223 determines the signal value of the edge pixel belonging to the coordinate-transformed edge as "1" and the signal value of the non-edge pixel not belonging to the edge as "0" (edge pixel filling). Here, if the area after transformation occupied by one pixel is equal to or more than a predetermined area (e.g. 0.5 pixels), the model integration part 223 specifies the pixel as the edge pixel and specifies the other pixels as non-edge pixels. Then, the processing moves to step S114.

Step S114

The model integration part 223 performs expansion processing with respect to the edge formed by the specified edge pixels. In the expansion processing, with respect to the edge pixel horizontally or vertically adjacent to non-edge pixels of the edge pixels contained in the edge area, the model integration part 223 converts the non-edge pixels into edge pixels. Thereby, a risk of defective association between the edges without finding out the areas overlapping each other due to a slight difference in position between the edge relating to the base model data BM and the edge relating to the additional model data AM may be reduced. Then, the processing moves to step S115.

Step S115

The model integration part 223 inverts the signal values "1" of the edge pixels and the signal values "0" of the non-edge pixels forming the edge map of the additional model data AM to each other, and respectively converts signal values of the edge pixels into "0" and signal values of the non-edge pixels into "1". Then, the processing moves to step S116.

Step S116

The model integration part 223 determines the signal value of the edge pixel belonging to the edge shown by the edge map relating to the base model data BM as "1" and the signal value of the non-edge pixel not belonging to the edge as "0" (signal edge pixel filling). Then, the processing moves to step S117.

Step S117

The model integration part 223 determines the area belonging to both the edge area (signal value "1") shown by the edge map relating to the base model data BM and the edge area (signal value "1") shown by the edge map relating to the additional model data AM as a mask. The model integration part 223 generates mask data (internal mask) representing the determined mask. Then, the processing shown in FIG. 7 is ended.

Note that the expansion processing (step S114) may be omitted in FIG. 7. Further, the model integration part 223 may make the degree of expansion higher by repeating the expansion processing at a predetermined number of times (e.g. twice).

In FIG. 7, Eg3 to Eg6 show examples of data generated at steps S113 to S116, respectively. Eg7 shows an example of mask data generated at step S117. In all of the data, the pixels having the signal value "1" are filled and the other areas are not filled.

The edge shown by Eg3 has a position and pose relationship associated with the edge shown by Eg6 by the mapping processing (step S112), and both of the edges are distributed from the lower left toward the upper right. Note that the edge shown by Eg3 is divided into two parts, while the edge shown by Eg6 is one continuous area. Here, in Eg3, the edges vertically extending in the fourth column from the right end and in the third column from the right is shown, while, in Eg6, an edge having another shape distributed from the third column from the lower end to the seventh column in the third row from the upper end is shown.

The edge shown by Eg4 is enlarged by one pixel for each in the forward direction and the backward direction with respect to the horizontal direction and the vertical direction from the edge shown by Eg3 by the expansion processing (step S114). The edge shown by Eg3 mainly has sections adjacent in the vertical direction, and the enlargement by the expansion processing is principal in the horizontal direction, not in the vertical direction.

The filled part shown by Eg5 shows the non-edge area in which the signal values are inverted by the inversion processing (step S115) with respect to the edge of Eg4.

The mask shown by Eg7 is an area in which the edge area shown by Eg6 and the non-edge area shown by Eg5 overlap. This area is an area in which, in Eg3, there is an apparent difference of the works between model data such as a difference of existence and absence of edge division or a difference in position and shape of the edges from Eg6.

Next, examples of model data will be explained.

Figure 8:
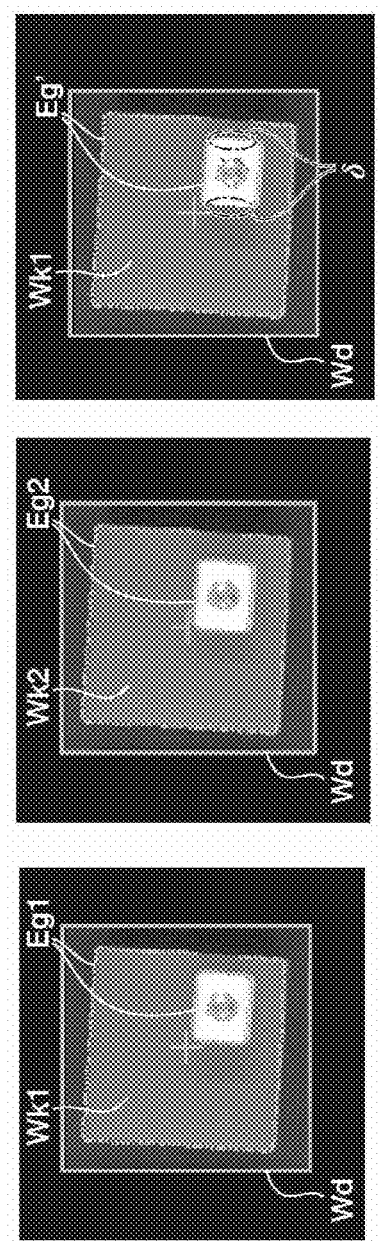
FIGS. 8A to 8C show examples of model data.

FIGS. 8A to 8C show examples of model data.

FIG. 8A shows an example of the base model data BM. In FIG. 8A, an image of the work Wk1 represented by the image data contained in the base model data BM is displayed with edges Eg1 shown by the edge map superimposed thereon. In this example, the edges Eg1 are detected in most of the outer contour of the work Wk1 and nearly the entire of the contour of a lower left projecting portion.

FIG. 8B shows an example of the additional model data AM. In FIG. 8B, an image of the work Wk2 represented by the image data contained in the additional model data AM is displayed with edges Eg2 shown by the edge map superimposed thereon. The work Wk2 is a work of the same kind as the work Wk1 and has a different position relationship with the imaging apparatus 10, however, the edges are associated between the works by coordinate transformation so that as many edges as possible may coincide. In FIG. 8B, in order to clarify the position relationship between the edge and the work Wk, the same coordinate transformation as that for the edge is performed on the work Wk2 image. In this example, the position relationship between the imaging apparatus 10 and the work Wk2 is different from the position relationship between the imaging apparatus 10 and the work Wk1 relating to the base model, and a lower left projecting portion is displaced leftward compared to the projecting portion of the work Wk1 with respect to the outer contour of the work Wk2. Accordingly, the edges Eg1 and the edges Eg2 are displaced from each other in the horizontal directions on both ends of the contours of the projection portions in the horizontal directions.

FIG. 8C shows an example of the integrated model data IM. In FIG. 8C, an image of the work Wk1 represented by the image data contained in the integrated model data IM is displayed with edges Eg' shown by the edge map superimposed thereon. Note that, of the edges Eg', areas of external masks δ are surrounded by dashed-dotted ovals. The areas of the external masks δ correspond to parts in which the edge Eg2 and the edge Eg' are different. In the parts, there are apparent differences due to the position and pose relationship and the irradiation condition of the light beam. The parts are ignored in the matching processing in the work detection processing, and thereby, reduction of the matching score calculated in the work detection processing, which will be described later, may be prevented or suppressed.

Next, the model generation processing according to the embodiment will be explained.

Figure 9:
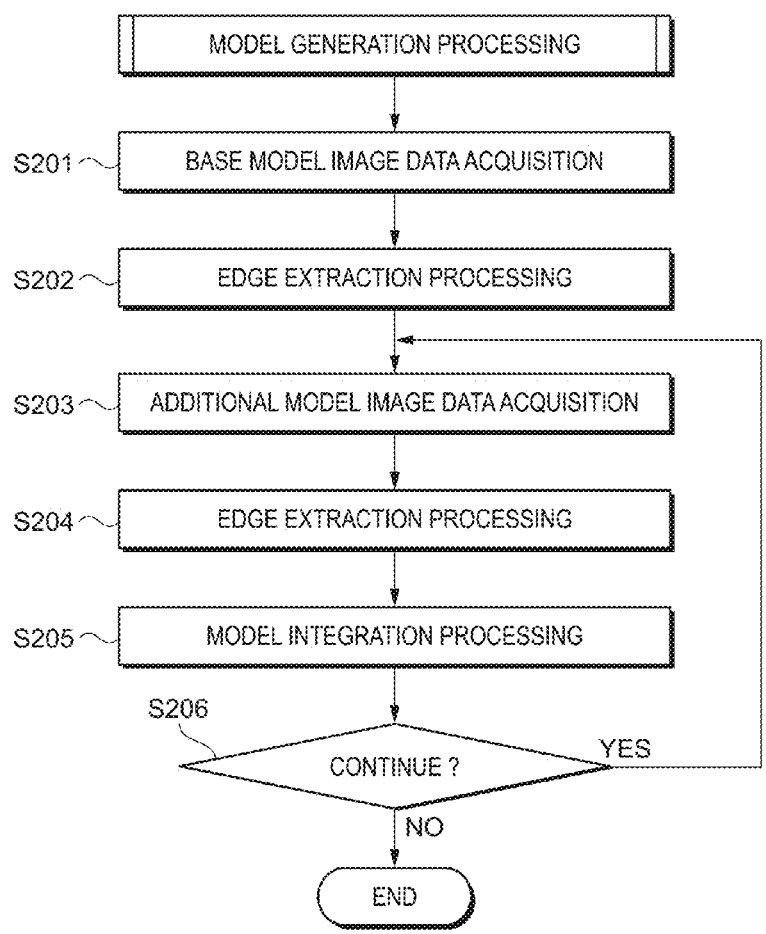
FIG. 9 is a flowchart showing the model generation processing according to the embodiment.

FIG. 9 is a flowchart showing the model generation processing according to the embodiment.

Step S201

The selection unit 221 acquires base model image data representing an image within a specified area by the operation input from the image data relating to the image displayed in the display unit 213 in response to input of the model image generation instruction signal from the operation input unit 212. Then, the processing moves to step S202.

Step S202

The feature extraction part 222 performs edge extraction processing with respect to the base model image data acquired by the selection unit 221, and generates an edge map showing the extracted edge. Then, the processing moves to step S203.

Step S203

The selection unit 221 acquires additional model image data representing an image within a specified area by the operation input from the image data relating to the image displayed in the display unit 213 in response to the second input of the model image generation instruction signal from the operation input unit 212. Then, the processing moves to step S204.

Step S204

The feature extraction part 222 performs edge extraction processing with respect to the additional model image data acquired by the selection unit 221, and generates an edge map showing the extracted edge. Then, the processing moves to step S205.

Step S205

The model integration part 223 extracts a part in which the edge shown by the edge map relating to the base model image data does not coincide with the edge shown by the edge map relating to the additional model image data as a mask. The model integration part 223 integrates mask data representing the extracted mask with the base model data containing the base model image data and the edge map, and generates integrated mask data (model integration processing). Then, the processing moves to step S206.

Step S206

When the model image generation instruction signal is further input from the operation input unit 212, the selection unit 221 determines continuation of the processing (step S206 YES) and moves to step S203. When the instruction signal input from the operation input unit 212 indicates ending of the processing, the selection unit 221 determines ending of the processing (step S206 NO) and ends the processing shown in FIG. 9.

Next, the work detection processing according to the embodiment will be explained.

Figures 10, 11:
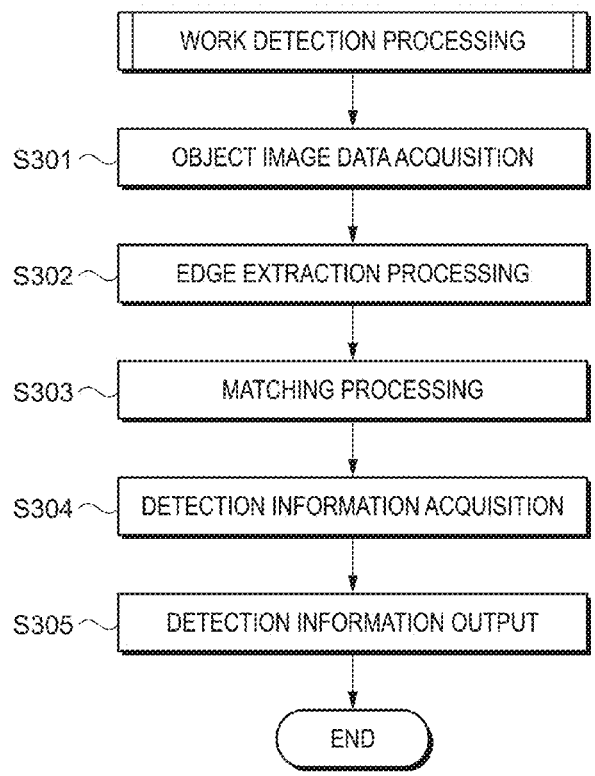
FIG. 10 is a flowchart showing work detection processing according to the embodiment.
FIG. 11 is a table showing examples of matching scores.

FIG. 10 is a flowchart showing the work detection processing according to the embodiment.

Step S301

In the data memory unit 215, the object image data input from the imaging apparatus 10 is sequentially stored. The feature extraction part 222 reads out and acquires the object image data from the data memory unit 215. Then, the processing moves to step S302.

Step S302

The feature extraction part 222 performs edge extraction processing with respect to the acquired object image data and generates an object edge map showing the extracted edges. Then, the processing moves to step S303.

Step S303

The matching part 224 reads out the integrated model data from the data memory unit 215 and extracts the edge map and the mask data from the read out integrated model data. The matching part 224 excludes the parts of the masks represented by the mask data from the edges shown by the extracted edge map and specifies reference edges. The matching part 224 performs matching processing between the edges shown by the object edge map and the reference edges, and searches for the position, direction, scaling factor of the reference edge with which the degree of coincidence is the maximum (e.g. highest) between the reference edges and the edges shown by the object edge map. In the search, the matching part 224 calculates a matching score with respect to each set of the position, direction, scaling factor of the reference edge and specifies the position, direction, scaling factor with which the calculated matching score is the maximum. Then, the processing moves to step S304.

Step S304

If the maximum value of the matching score is equal to or more than a predetermined score acceptable value, the detection information acquisition part 225 determines that the detection of the object has been successful. The detection information acquisition part 225 generates (acquires) detection information representing the position and direction of the object obtained based on the position and direction specified by the matching part 224 and the successful detection of the object. If the maximum value of the matching score is smaller than the predetermined score acceptable value, the detection information acquisition part 225 determines that the detection of the object has been unsuccessful. The detection information acquisition part 225 generates (acquires) detection information representing the unsuccessful detection of the object. Then, the processing moves to step S305.

Step S305

The detection information acquisition part 225 outputs the acquired detection information to the robot control apparatus 23 via the data input/output unit 214. Then, the processing shown in FIG. 10 is ended.

Next, examples of matching scores will be explained.

FIG. 11 is a table showing the examples of matching scores.

FIG. 11 shows the matching scores before and after model addition with respect to each work to be operated by the robot 30. The matching scores shown in FIG. 11 are score values (the maximum value is 1000) calculated using the calculation method of score values described in Patent Document 1 in the work detection processing (FIG. 10). "Before model addition" refers to the case where the edges shown by the edge map of the base image data are used without change for matching as is the case of related art. In the examples shown in FIG. 11, the edge extracted from the model image data representing the work Wk2 is used. "After model addition" refers to the case where the reference edge obtained by removing the masks from the edges shown by the edge map contained in the integrated model data generated by the embodiment is used for matching. In the examples shown in FIG. 11, the integrated model data generated based on the base image data representing the work Wk1 and the additional image data representing the work Wk2 is used.

According to FIG. 11, regarding the works Wk1 and Wk3, the matching scores after model addition are 950 and 942, respectively, and significantly increased from the matching scores 892 and 879 before model addition. The parts with different appearances of the works are ignored using the masks generated by the embodiment, and thereby, reduction of the mask scores is suppressed. Accordingly, the object may be detected without reduction of the score acceptable value in matching processing, and the detection accuracy may be improved.

Note that, regarding the work Wk2, the matching score after model addition is 996 and only slightly increased from the matching score before model addition 994. This is because the base model data based on the image data representing the work Wk2 imaged under the same condition as the work Wk2 to be detected is used in the matching processing.

Note that, as described above, when the imaging conditions are different between the target shown by the image captured after previous mask generation processing and the object shown by the image captured in the runtime (during execution of the work detection processing), even if the target and the object are the same work, apparent shapes are different. In the matching processing of related art, the calculated matching score is lower. On the other hand, when the score acceptable value is made lower for object detection, a risk of false detection of other works having similar shapes and the background as the objects corresponding to the target is higher.

Accordingly, in order to prevent reduction of the matching score, it is conceivable that the user specifies the part varied in apparent shape of the object and manually masks the part, and matching against the shape of the target is performed except the masked part.

However, when the part varied in shape is specified, the user is required to visually make a detailed comparison among contours of a plurality of models and manually accurately specify the position and area of the varied part. Accordingly, the operation for specifying the position and area of the varied part as the part to be masked generally tends to be difficult and complicated. Further, if a part not necessary to be masked is masked, the area used for matching is smaller and the accuracy of matching is lower, and that causes false detection of other works having similar shapes and the background.

As described above, the robot system 1 according to the embodiment includes the image processing apparatus 21 that detects one work from a plurality of works (e.g. works Wk1 to Wk3) and the robot 30 that operates the detected one work. The image processing apparatus 21 includes the display unit 213 that displays image data containing an image of the plurality of works captured by the imaging apparatus 10 and the selection unit 221 that selects the first image (e.g. base model image) and the second image (e.g. additional model image) from the image data. Further, the image processing apparatus 21 includes the processing unit 220 that generates a model (e.g. integrated model data) based on the first image and the second image and detects one work using the generated model.

According to the configuration, the work is detected using the model generated based on the first image and the second image under a different imaging condition. Accordingly, even when there is a change in appearance due to the difference between the imaging conditions, the work to be detected may be reliably detected.

In the robot system 1, the processing unit 220 includes the feature extraction part 222 that extracts a feature with respect to each area formed by segmentation of the first image, the second image, and the image data. Further, the processing unit 220 includes the model integration part 223 that generates a model containing an image feature (e.g. edge map) as one of the feature of the first image and the feature of the second image and a mask area (e.g. internal mask) in which the feature of the first image and the feature of the second image are different. Furthermore, the processing unit 220 includes the matching part 224 that performs matching between the area (e.g. reference edge) from which the mask area is excluded from the image feature and the feature of the image data (e.g. object edge map).

According to the configuration, the area in which the features are different between the first image and the second image is excluded, and matching is performed between the areas with features unchanged due to the difference between the imaging conditions. Accordingly, the work to be detected may be reliably detected.

In the robot system 1, the feature extraction part 222 respectively extracts the edges with respect to the first image, the second image, and the image data.

According to the configuration, matching is performed based on the edges showing the contours and patterns of the works as features of images, and the position and direction of the work to be detected may be efficiently detected.

In the robot system 1, the model integration part 223 performs e.g. coordinate transformation, and thereby, associates position and pose relationships between the feature of the first image and the feature of the second image and determines a mask area.

According to the configuration, even when the position or pose relationships do not coincide between the first image and the second image, mask areas with different features between the corresponding areas of the first image and the second image may be determined.

In the robot system 1, the model integration part 223 performs expansion processing with respect to at least one of the feature of the first image and the feature of the second image, and determines a mask area in which the feature of the first image and the feature of the second image are different.

According to the configuration, even when the position relationships are slightly different due to the difference between the imaging conditions of the first image and the second image, the features may be compared between the corresponding areas, and the work to be detected may be reliably detected.

In the robot system 1, the matching part 224 calculates a matching score indicating the degree of coincidence between the area obtained by changing the position and direction with respect to the area formed by exclusion of the mask area from the image feature (e.g. reference edge) and the feature of the object image data with respect to each amount of change of the position and direction, and detects the position and direction of one work based on the matching scores.

According to the configuration, in the object image data, the area corresponding to the area formed by exclusion of the mask area from the image feature is quantitatively specified, and thereby, the work represented by the image feature and its position and direction may be detected.

In the robot system 1, the image processing apparatus 21 includes the detection information acquisition part 225 that determines whether or not to have detected one work based on the scores calculated by the matching part 224.

According to the configuration, whether or not the object detection according to the image feature is successful may be quantitatively determined based on the degree of coincidence between the feature of the image data and the area formed by exclusion of the mask area from the image feature.

As above, the embodiment of the invention is described in detail with reference to the drawings. The specific configuration is not limited to the embodiment, but changes, replacements, deletions, etc. may be made without departing from the scope of the invention.

For example, in the above described embodiment, the case where the robot 30 is a single-arm robot having one arm part 30b is taken as an example, however, not limited to that. The robot 30 may be a dual-arm robot having two arm parts or a horizontal articulated robot (the so-called scalar robot).

The image processing apparatus 21 may be separated from the robot control apparatus 23 as described above, or integrally formed.

The robot control apparatus 23 may be separated from the robot 30 as described above, or integrally formed.

Further, all of the imaging apparatus 10, the image processing apparatus 21, the robot control apparatus 23, and the robot 30 may be integrally formed.

The robot system 1 may be used as a work detection system. For example, the image processing apparatus 21 may detect one work mounted on a belt conveyer and the robot 30 may operate the work detected by the image processing apparatus 21. The image processing apparatus 21 may acquire a model image showing the work with respect to each of a plurality of positions on the belt conveyer and generate integrated model data based on the acquired model images. The respective appearances are different among the plurality of positions on the belt conveyer, however, according to the embodiment, the matching processing is performed after exclusion of the parts having different appearances of the model images, and the work detection accuracy may be improved.

Further, the robot system 1 may be used for bin picking. For example, the image processing apparatus 21 may detect one work from many works randomly stacked on the work table and the robot 30 may operate the work detected by the image processing apparatus 21. The image processing apparatus 21 may acquire model images respectively showing at least two works from the plurality of works randomly stacked on the work table in advance, and generate integrated model data based on the acquired model images. The positions, directions, and the irradiation statuses of the light beam are different among the respective stacked works, and the respective appearances are different. For example, when the works are screws, apparent differences in threads provided in shaft parts and metallic luster are significant among the works. According to the embodiment, the matching processing is performed after exclusion of the parts having different appearances of the model images, and the object detection accuracy may be improved.

The image processing apparatus 21 may execute visual servoing in cooperation with the robot control apparatus 23. In the visual servoing, edge data contained in the integrated model data previously generated by the image processing apparatus 21 may be used as a goal image as a control target. In the visual servoing, when matching processing is performed with respect to the edge data generated from the captured image and the goal image, the image processing apparatus 21 excludes an area of a mask represented by mask data contained in the integrated model data.

Further, in the above described embodiment, the case without consideration of the user mask is taken as an example, however, not limited to that. The model integration part 223 may determine an area belonging to at least one of the user mask contained in the base model data BM and the user mask contained in the additional model data AM as a new user mask. In this case, when generating the integrated model data IM, the model integration part 223 updates the user mask contained in the base model data BM to the new user mask.

Furthermore, the matching part 224 may specify the reference edge by excluding a part belonging to at least one of a part of the internal mask and a part of the user mask from edges shown by the edge map extracted from the integrated model data, and performs matching processing between the edge shown by the object edge map and the reference edge.

A program for realization of a function of an arbitrary configuration part in the above described apparatus (e.g. the image processing apparatus 21 of the robot system 1) may be recorded in a computer-readable recording medium and the program may be loaded and executed in a computer system. Note that "computer system" here includes an OS (Operating System) or hardware such as a peripheral device. Further, "computer-readable recording medium" refers to a portable medium including a flexible disc, magneto-optical disc, ROM, and CD (Compact Disc) (registered trademark)-ROM or a storage device including a hard disc built in the computer system. Furthermore, "computer-readable recording medium" includes a medium that holds a program in a fixed time such as a volatile memory (e.g. RAM) within the computer system serving as a server or client when the program is transmitted via a network including the Internet or a communication line including a telephone line.

The program may be transmitted from a computer system storing the program in a storage device or the like via a transmission medium or by transmission wave in the transmission medium to another computer system. Here, "transmission medium" that transmits the program refers to a medium having a function of transmitting information such as a network (communication network) including the Internet or a communication line including a telephone line.

Further, the program may be a program for realization of a part of the above described function. Furthermore, the program may be a program that may realize the above described function by a combination with a program previously recorded in the computer system, the so-called differential file (differential program).

The entire disclosure of Japanese Patent Application No. 2014-136314, filed Jul. 1, 2014 is expressly incorporated by reference herein.

What is claimed is:
1. A robot system comprising:
a memory that includes computer-readable instructions;
a processor that is configured to execute the computer-readable instructions to detect one work from a plurality of works; and
a robot that handles the detected one work,
wherein when the computer-readable instructions are executed by the processor, the processor is configured to:
capture an image of the plurality of works by an imaging device;
display image data containing the captured image;

select a first image and a second image from the image data;

extract a feature with respect to each area obtained by respective segmentation of the first image, the second image, and the image data;

generate a model containing an image feature as one of a feature of the first image and a feature of the second image, and a mask area in which the feature of the first image and the feature of the second image are different; and perform matching between an area formed by exclusion of the mask area from the image feature and a feature of the image data so as to detect the one work.

2. The robot system according to claim 1, wherein the processor is configured to respectively extract edges with respect to the first image, the second image, and the image data.

3. The robot system according to claim 1, wherein the processor is configured to associate position and pose relationships between the feature of the first image and the feature of the second image and determine the mask area.

4. The robot system according to claim 1, wherein the processor is configured to perform expansion processing with respect to at least one of the feature of the first image and the feature of the second image and a determine the mask area in which the feature of the first image and the feature of the second image are different.

5. The robot system according to claim 1, wherein the processor is configured to calculate a score indicating a degree of coincidence between an area obtained by changing the position and direction with respect to the area formed by exclusion of the mask area from the image feature and the feature of the image data with respect to each amount of change of the position and direction, and detect the position and direction of the one work based on the score.

6. The robot system according to claim 5, wherein the processor is configured to determine whether the one work has been detected based on the score.

7. A processing apparatus that is configured to execute computer-readable instructions stored in a memory by a processor so as to detect one work from a plurality of works and cause a robot to handle the one work, the processing apparatus comprising:

when the computer-readable instructions are executed by the processor, the processor is configured to:

cause an imaging device to capture an image of the plurality of works;

cause a display to display image data containing the captured image;

select a first image and a second image from the image data;

extract a feature with respect to each area obtained by respective segmentation of the first image, the second image, and the image data;

generate a model containing an image feature as one of a feature of the first image and a feature of the second image and a mask area in which the feature of the first image and the feature of the second image are different; and performs matching between an area formed by exclusion of the mask area from the image feature and a feature of the image data so as to detect the one work.

8. The processing apparatus according to claim 7, wherein the processor is configured to respectively extract edges with respect to the first image, the second image, and the image data.

9. The processing apparatus according to claim 7, wherein the processor is configured to associate position and pose relationships between the feature of the first image and the feature of the second image and determines the mask area.

10. The processing apparatus according to claim 7, wherein the processor is configured to perform expansion processing with respect to at least one of the feature of the first image and the feature of the second image and determine the mask area in which the feature of the first image and the feature of the second image are different.

11. The processing apparatus according to claim 7, wherein the processor is configured to calculate a score indicating a degree of coincidence between an area obtained by changing the position and direction with respect to the area formed by exclusion of the mask area from the image feature and the feature of the image data with respect to each amount of change of the position and direction, and detect the position and direction of the one work based on the score.

12. The processing apparatus according to claim 11, wherein the processor is configured to determine whether the one work has been detected based on the score.

13. A robot operated by the processing apparatus according to claim 7.

14. A robot operated by the processing apparatus according to claim 8.

15. A robot operated by the processing apparatus according to claim 9.

16. A robot operated by the processing apparatus according to claim 10.

17. A robot operated by the processing apparatus according to claim 11.

* * * * *